United States Patent [19]
Ariyoshi et al.

[11] Patent Number: 5,131,559
[45] Date of Patent: Jul. 21, 1992

[54] RESIN CASING

[75] Inventors: Hideho Ariyoshi; Kazuyuki Kaino, both of Hirakata, Japan

[73] Assignee: Matsushita Electric Industrial Co., Ltd., Osaka, Japan

[21] Appl. No.: 656,826

[22] Filed: Feb. 19, 1991

[30] Foreign Application Priority Data

Feb. 19, 1990 [JP] Japan .................... 2-37624

[51] Int. Cl.⁵ .............................................. B65D 1/24
[52] U.S. Cl. .................................. 220/555; 220/507; 429/176
[58] Field of Search ............... 220/507, 510, 529, 553, 220/555; 429/153, 176; 264/56, 57, 63

[56] References Cited

U.S. PATENT DOCUMENTS

| 1,532,263 | 4/1925 | Reiser | 429/176 X |
|---|---|---|---|
| 1,922,082 | 8/1933 | Dunzweiler | 429/176 X |
| 3,665,790 | 5/1972 | Jones | 220/555 X |
| 3,817,372 | 6/1974 | Smith | 220/507 X |
| 3,972,737 | 8/1976 | Sullivan et al. | 429/176 |
| 4,034,885 | 7/1977 | Hunckler et al. | 220/507 X |
| 4,063,007 | 12/1977 | Spiegelberg | 429/176 |
| 4,192,439 | 3/1980 | Segal | 220/507 X |
| 4,344,748 | 8/1982 | Oxenreider et al. | 429/176 X |
| 4,384,031 | 5/1983 | Kline | 429/176 |
| 4,703,849 | 11/1987 | Vezirian et al. | 206/217 |

FOREIGN PATENT DOCUMENTS 56-32665  4/1981  Japan .................... 429/176

Primary Examiner—Stephen Marcus
Assistant Examiner—Stephen Cronin
Attorney, Agent, or Firm—Wenderoth, Lind & Ponack

[57] ABSTRACT

A resin casing of a box-like configuration has side walls, a bottom wall and a plurality of partition walls. Each partition wall has two opposite end portions tapered, at which the partition wall is integrally formed with the side wall. Thus, the cooling speed is made constant at every portion in the resin casing to avoid shrinkage marks and unwanted raised lines.

2 Claims, 2 Drawing Sheets

RESIN CASING

BACKGROUND OF THE INVENTION

1. Field of the Invention

The present invention generally relates to a casing manufactured of resin by the injection molding process and, more particularly, to such a resin casing having a plurality of cells.

2. Description of the Prior Art

A resin casing having a plurality of cells is required to have high precision and high quality of external appearance. Furthermore, to satisfy these requirements, it is necessary to make the partition wall, defining a cell together with the walls of the resin casing, thinner than that of the side walls of the injection molded casing in order to prevent a shrinkage mark from appearing on the surface of the side walls of the casing.

Hereinafter, an example of the above mentioned conventional resin casing is described with reference to the accompanying drawings.

FIG. 3 shows a perspective view of a conventional resin casing having a plurality of cells. In FIG. 3, reference numeral 11 designates a resin casing, reference numeral 2 a partition wall for dividing the internal space of the resin casing 11, reference numeral 3 a side wall of the resin casing 11, and reference numeral 4 a blister, or raised line, appearing on the side wall 3 of the resin casing 11. FIG. 4 shows a top plan view of the resin casing 11.

According to the resin casing constructed as mentioned above, the shape of the resin casing after injection molding is described hereafter.

In the resin casing produced by an injection molding process, the partition wall 2 generally has a thickness thinner than that of the side wall 3 by 30% to 50% in order to have, after the injection molding, a high surface quality of the side wall 3. This is because if the partition wall 2 had the same thickness as that of side wall 3, cooling will be done unevenly after the molded piece is ejected, resulting in heat accumulation in places at which the cooling takes place after some time delay to cause partial shrinkage. Such a partial shrinkage makes a mark on the surface. Therefore, it is known that the partition wall should be as thin as possible to prevent such uneven cooling.

However, in the resin casing of the above described construction, since the partition wall 2 is so thin, it cools down fast and rapidly becomes stiff. Thus, the apparent shrinkage of the partition wall 2 is smaller than the shrinkage of the bottom plate 20 of the resin casing 11, causing pushing out of the side wall 3 by the partition wall 2. Thus, the side wall 3 is corrugated to form raised lines 4, and thus the outer precision of the resin housing is degraded in the finished product.

SUMMARY OF THE INVENTION

The present invention has been developed with a view to substantially solving the above described disadvantages and has for its essential object to provide an improved resin casing.

In order to achieve the aforementioned object, the present invention provides a resin casing having a plurality of cells which comprise a box integrally formed by side wall members and a bottom plate, and a plurality of partition walls integrally formed inside the box. Each of the partition walls is tapered at side end portions connected to the side walls.

BRIEF DESCRIPTION OF THE DRAWINGS

These and other objects and features of the present invention will become clear from the following description taken in conjunction with the accompanying drawings throughout which like parts are designated by like reference numerals, and in which.

DETAILED DESCRIPTION OF THE PREFERRED EMBODIMENTS

Figure 1:
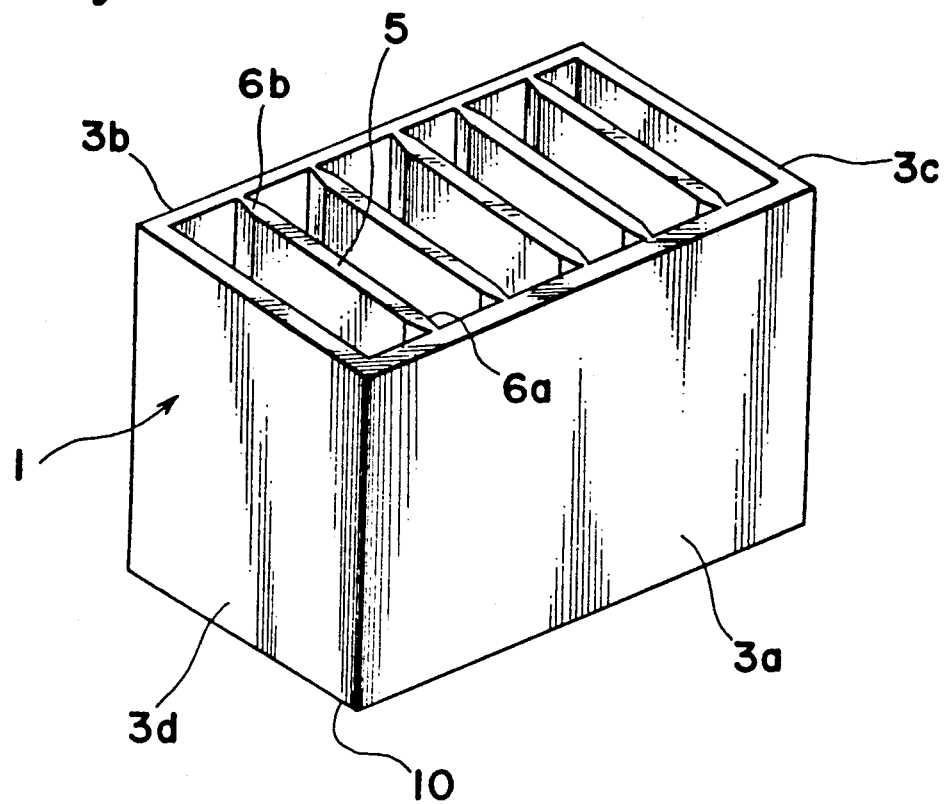
FIG. 1 is a perspective view of a resin casing having a plurality of cells according to the present invention.

Referring to FIG. 1, a resin casing having a plurality of cells which is made by a injection molding process according to a preferred embodiment of the present invention is shown.

As shown therein, the resin housing 1 comprises four side walls 3a, 3b, 3c, and 3d and a bottom wall 10 (not shown) integrated together to provide a rectangular box with a top side opposite to the bottom wall 10 being opened. The resin casing 1 further comprises a plurality of partition walls 5 provided inside the resin casing 1 and aligned parallel to the side walls 3c and 3d with predetermined spacing. Each partition wall 5 has opposite side ends 6a and 6b integrally formed with the side walls 3a and 3b, respectively.

Figure 2A:
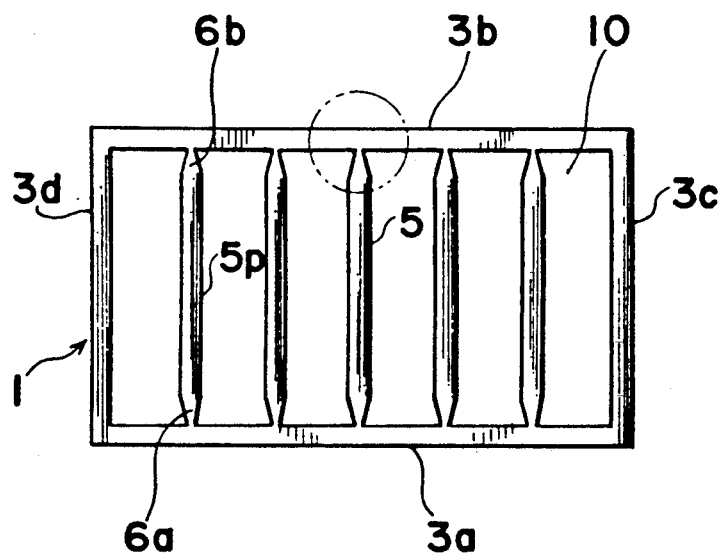
FIG. 2a is a top plan view of the resin casing shown in FIG. 1.

Referring to FIG. 2a, the partition wall 5 is formed as a generally rectangular plate and the opposite side end portions 6a and 6b thereof are tapered.

Figure 2B:
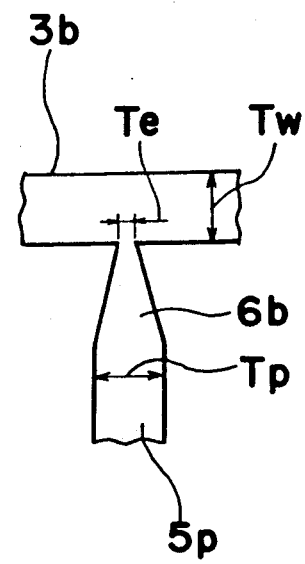
FIG. 2b is a fragmentary top plan view showing, on an enlarged scale, the portion of FIG. 2a which is circled by an imaginary line.
Figure 3:
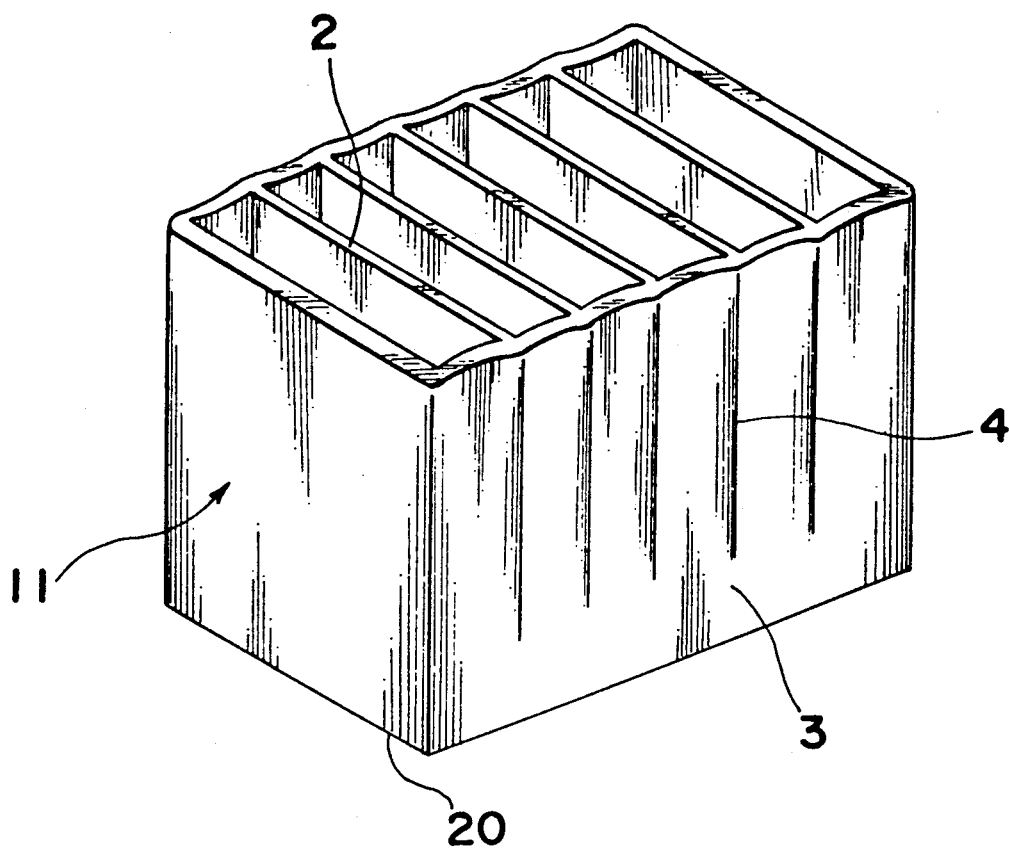
FIG. 3 is a perspective view of a resin casing having a plurality of cells according to the prior art.
Figure 4:
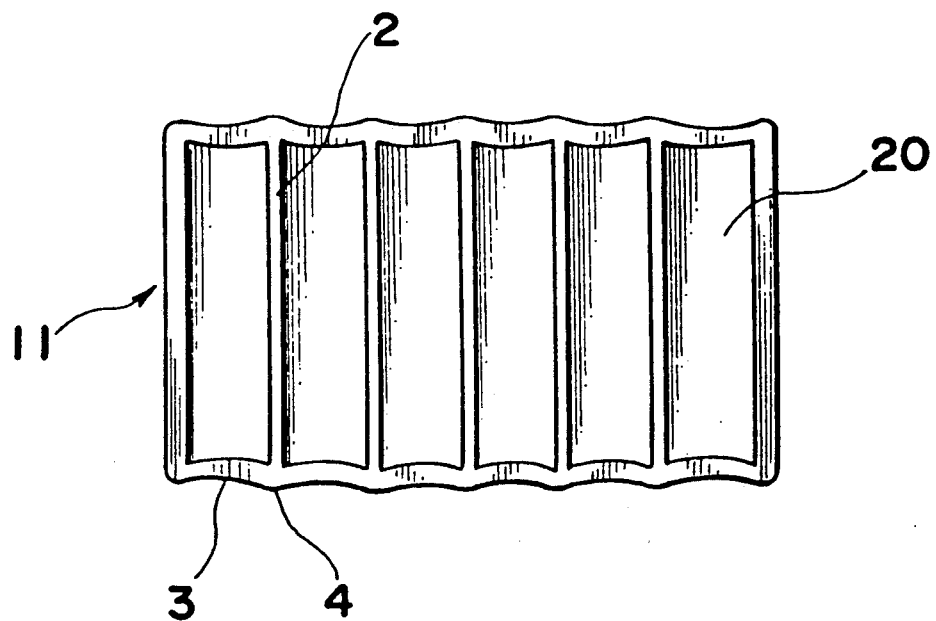
FIG. 4 is a top plan view of the resin casing shown in FIG. 3.

Referring to FIG. 2b, the thickness of the partition wall 5 at the main body portion 5p, or non-tapered portion, is Tp; the thickness of the partition wall 5 at the tapered end is Te; and the thickness of the side wall 3b is Tw. In other words, $Te < Tp \leq Tw$ is obtained.

The above described thickness Tp, Te and Tw have the relationships such that, Tp is equal to or slightly smaller than Tw, and Te is 50% to 70% of Tw. In other words, $0.5\,Tw \leq 0.5Te \leq 0.7Tw$ is obtained.

As a result, the cooling of the casing at every portion thereof starts simultaneously, so that the side walls 3a, 3b, 3c and 3d, partition walls 5 and bottom plate 10 will be cooled down simultaneously. Thus, there will be no raised lines formed on the outer surface of the side walls 3a and 3b. Furthermore, since there will be no heat accumulation at the T-joint portions of the side wall and the partition wall, there will be no shrinkage mark formed on the outer surface of the side walls 3a and 3b.

The resin casing having a plurality of cells according to the present invention has partition walls 5 so arranged that the thickness thereof adjacent the side wall 3 is smaller than that of the side wall 3, and the thickness of the main body portion thereof is greater than that of the tapered end portion, but equal to or slightly smaller than that of the side wall 3. Thus, the resin casing according to the present invention will not have the raised lines formed during the cooling, i.e., after the molded piece is ejected. Accordingly, the present invention can provide a resin casing of high quality with no shrinkage mark on the surfaces.

It is to be noted that the tapered portion is shown as formed by slanted side faces on both side planes of the partition wall, but can be formed by a slanted side face on only one side plane face of the partition wall.

Although the present invention has been fully described in connection with the preferred embodiment thereof with reference to the accompanying drawings, it is to be noted that various changes and modifications will be apparent to those skilled in the art. Such changes and modifications are to be understood as included within the scope of the present invention as defined by the appended claims unless they depart therefrom.

What is claimed is:

1. A resin casing having a plurality of cells comprising:
   a box integrally formed by side wall members and a bottom plate; and
   a plurality of partition walls integrally formed inside said box, each of said partition walls having a tapered portion at opposite ends which are connected to said side walls, each of said partition walls having a thickness $T_e$ at said tapered ends and a thickness $T_p$ at a portion other than said tapered portion, and said side walls having a thickness $T_w$, said thicknesses $T_e$, $T_p$ and $T_w$ having a relationship $T_e < T_p \leq T_w$, and said thicknesses $T_e$ and $T_w$ further having the relationship $0.5 T_w \leq T_e \leq 0.7 T_w$.

2. A resin casing as claimed in claim 1, wherein said resin casing is formed by an injection molding process.

* * * * *